(12) United States Patent  
Lee et al.

(10) Patent No.: US 8,174,663 B2
(45) Date of Patent: May 8, 2012

(54) LIQUID CRYSTAL DISPLAY DEVICE AND METHOD FOR FABRICATING THE SAME

(75) Inventors: Seung-Hyun Lee, Seoul (KR); Young-Sup Jung, Seoul (KR)

(73) Assignee: LG Display Co., Ltd., Seoul (KR)

( * ) Notice: Subject to any disclaimer, the term of this patent is extended or adjusted under 35 U.S.C. 154(b) by 154 days.

(21) Appl. No.: 12/647,933

(22) Filed: Dec. 28, 2009

(65) Prior Publication Data
US 2011/0013125 A1    Jan. 20, 2011

(30) Foreign Application Priority Data

Jul. 17, 2009  (KR) .................. 10-2009-0065456

(51) Int. Cl.
*G02F 1/1339* (2006.01)
(52) U.S. Cl. ........ 349/153; 349/190; 349/155; 349/156; 349/157
(58) Field of Classification Search .................. None
See application file for complete search history.

(56) References Cited

U.S. PATENT DOCUMENTS

| | | | |
|---|---|---|---|
| 2003/0025868 A1* | 2/2003 | Hiroshima et al. | 349/156 |
| 2003/0112405 A1* | 6/2003 | Kim et al. | 349/156 |
| 2005/0062925 A1* | 3/2005 | Kim et al. | 349/155 |

FOREIGN PATENT DOCUMENTS

| | | |
|---|---|---|
| CN | 101093322 | 12/2007 |
| JP | 2002-202512 | 7/2002 |
| KR | 10-2005-0033293 | 4/2005 |
| KR | 10-2007-0122082 | 12/2007 |

* cited by examiner

*Primary Examiner* — Thanh-Nhan P. Nguyen
(74) *Attorney, Agent, or Firm* — Morgan, Lewis & Bockius LLP

(57) ABSTRACT

The present invention relates to a liquid crystal display device and a method for fabricating the same, which has a structure applied thereto for preventing a liquid applied to a substrate from passing through a display portion to encroach even to a seal pattern portion causing seal breakage or gap defect.

The liquid crystal display device includes first and second substrates placed opposite to each other, each having an active region at a center thereof, a seal pattern formed on an outside circumference of the active region spaced from a boundary portion of the active region, between the first substrate and the second substrate, a spread preventive wall formed on the first substrate between the boundary portion of the active region and the seal pattern, and an alignment film formed on an inner side of the spread preventive wall on the first substrate.

6 Claims, 6 Drawing Sheets

A/A a portion where an alignment film to be formed thereon a portion where an alignment film to be formed thereon

LIQUID CRYSTAL DISPLAY DEVICE AND METHOD FOR FABRICATING THE SAME

CROSS REFERENCE TO RELATED APPLICATION

This application claims the benefit of the Patent Korean Application No. 10-2009-0065456, filed on Jul. 17, 2009, which is hereby incorporated by reference as if fully set forth herein.

BACKGROUND OF THE DISCLOSURE

1. Field of the Disclosure

The present invention relates to liquid crystal display devices, and, more particularly, to a liquid crystal display device and a method for fabricating the same, which has a structure applied thereto for preventing a liquid applied to a substrate from passing through a display portion to encroach even to a seal pattern portion causing seal breakage or gap defect.

2. Discussion of the Related Art

In a current information oriented society, as a visual information transmission media, importance of the display devices are being emphasized further, and, in order to take a major position hereafter, the display devices are required to fulfill necessary conditions of low power consumption, thin, high definition, and so on.

In the display devices, there are light emission types that emit lights for themselves, such as a cathode ray tube CRT, an electro luminescence EL, a light emitting diode LED, a vacuum fluorescent display VFD, a field emission display FED, a plasma display panel PDP, and so on, and non-light emission types that can not emit the light for themselves, such as a liquid crystal display device LCD.

Of the display devices, since the liquid crystal display device, a device for displaying an image by using an optical anisotropy of liquid crystals, has a visibility better than the cathode ray tube, an average power consumption lower than the cathode ray tube of the same screen size, and lower heat generation, the liquid crystal display device is spot lighted as a next generation display device together with the plasma display panel and the field emission display FED.

In general, the liquid crystal display device is a display device in which picture signals are supplied to a matrix of pixels respectively, for displaying a desired picture by controlling light transmissivities of the pixels. For this, the liquid crystal display device is provided with a lower substrate having thin film transistors arranged thereon and an upper substrate having color filters formed thereon bonded together with a liquid crystal layer disposed therebetween. The lower substrate and the upper substrate have polarizing plates formed on surfaces thereof for blocking the light or controlling transmission of the light depending on a direction of incidence of the light.

The lower substrate and the upper substrate have alignment films formed at uppermost layers respectively for fixing an initial orientation of the liquid crystals.

A process for bonding the upper substrate and the lower substrate to fabricate one liquid crystal display panel thus is called as a cell process. The cell process has an alignment step for forming the alignment films to orient the liquid crystals on the lower substrate having thin film transistors arranged thereon and the upper substrate having color filters formed thereon in the same direction, a bonding step for bonding the two substrate with a fixed cell gap therebetween maintained, a sealing step for injecting the liquid crystals between the upper and lower substrates, and a cell cutting step for separating into the liquid crystal panels.

Thereafter, upper/lower polarization plates are attached to front/rear surfaces of the liquid crystal display panel respectively. The polarization plate is formed in a state a protective film is attached thereto, and the polarization plates are attached thus after the protective film is removed from each of the polarization plates with an absorber and peeling unit.

A related art liquid crystal display device will be described with reference to the attached drawings.

FIGS. 1A and 1B illustrate a section and a plan views of a related art liquid crystal display device after coating an alignment film, respectively.

Referring to FIGS. 1A and 1B, in formation of the alignment film on a substrate in the related art liquid crystal display device, after coating alignment film liquid 15, the alignment film liquid is dried in a baking step to form the alignment film. At first, at the time the alignment film liquid 15 is being coated, the alignment film liquid 15 passes a portion to coat the alignment film thereon actually due to spreadability of the alignment film liquid 15, and, if the spreadability is excessive, the alignment film liquid 15 fails to return to the portion to coat the alignment film thereon, but remains to encroach even a portion where a seal pattern is to be formed, later.

If the alignment film liquid 15 encroaches the portion where a seal pattern is to be formed, the alignment film liquid 15 is hardened in the baking step remaining as the alignment film on the portion where a seal pattern is to be formed, to cause a gap defect as much as a height of the alignment film at a portion the alignment film and the seal pattern overlap, and a tendency of peeling of the seal pattern from the alignment film due to poor adhesiveness of the seal pattern to the alignment film, or seal breakage. It is understood that a cause of the defect is meeting of the seal pattern and the alignment film due to failure of return of the alignment film liquid 15 into the portion to coat the alignment film thereon after the encroach.

Thus, the related art liquid crystal display device has the following problems.

In a case of an alignment film formed on the substrate in a liquid state by liquid handling step, if the alignment film liquid passes a predetermined coating portion, the alignment film liquid can encroach into a portion to form a seal pattern thereon, and, once the alignment film liquid encroaches the portion to form a seal pattern thereon, return of the alignment film into the predetermined coating portion is difficult, remaining in the portion to form a seal pattern thereon. In this case, if the alignment film baked thus and the seal pattern meet, a defect of light leakage takes place at this portion due to peeling of the seal pattern, seal breakage, or gap defect. Consequently, an effort for preventing this from taking place is required.

SUMMARY OF THE DISCLOSURE

Accordingly, the present invention is directed to a liquid crystal display device and a method for fabricating the same.

An object of the present invention is to provide a liquid crystal display device and a method for fabricating the same, which has a structure applied thereto for preventing a liquid applied to a substrate from passing through a display portion to encroach even to a seal pattern portion causing seal breakage or gap defect.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes first and second substrates placed opposite to each other, each having an active region at a center thereof, a seal pattern formed on an outside circumference of the active region spaced from a boundary portion of the active region between the first substrate and the second substrate, a spread preventive wall formed on the first substrate between the boundary portion of the active region and the seal pattern, and an alignment film formed on an inner side of the spread preventive wall on the first substrate.

The spread preventive wall may include a first spread preventive wall and a second spread preventive wall formed spaced from each other.

Preferably, the spread preventive wall is formed spaced 1 mm or more than 1 mm from the boundary of the active region.

Preferably, the spread preventive wall has four opened corners.

The liquid crystal display device further includes black matrix layers formed at a portion inside the active region of the first substrate and a boundary portion of the active region, color filter layers formed at the active region of the first substrate, and a column spacer formed on the black matrix layer at a portion inside the active region. The spread preventive wall is formed on the same layer with the column spacer, and the spread preventive wall has a height lower than the column spacer.

In another aspect of the present invention, a method for fabricating a liquid crystal display device includes the steps of providing first and second substrates each having an active region at a center thereof, forming black matrix layers and color filter layers on the first substrate, applying an organic insulating film on an entire surface of the first substrate including the black matrix layers and the color filter layers and removing the organic insulating film selectively, to form a column spacer on a portion of the black matrix layer at a portion inside the active region and a spread preventive wall disposed between the seal pattern and the boundary portion of the active region and spaced a predetermined distance therefrom, forming an alignment film at the active region of the first substrate including the black matrix layers, the color filter layers, and the column spacer and within the predetermined distance from the boundary portion of the active region, forming a seal pattern on an outside circumference of the spread preventive wall to surround the active region, forming a thin film transistor array at the active region of the second substrate, forming a liquid crystal layer on one of the first and second substrates, and bonding the first and second substrates together.

Preferably, forming the spread preventive wall includes forming a first spread preventive wall and a second spread preventive wall spaced from each other.

Preferably, the spread preventive wall is formed at a height lower than the column spacer, and the predetermined distance is equal to or greater than 1 mm.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1A:
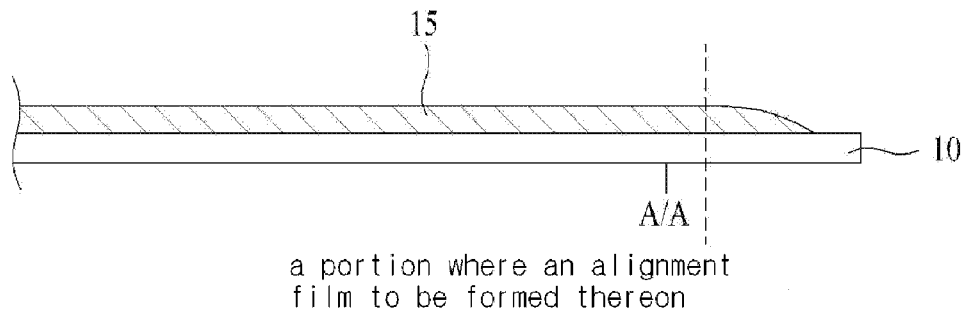
FIGS. 1A and 1B illustrate a section and a plan views of a related art liquid crystal display device after coating an alignment film, respectively.
Figure 1B:
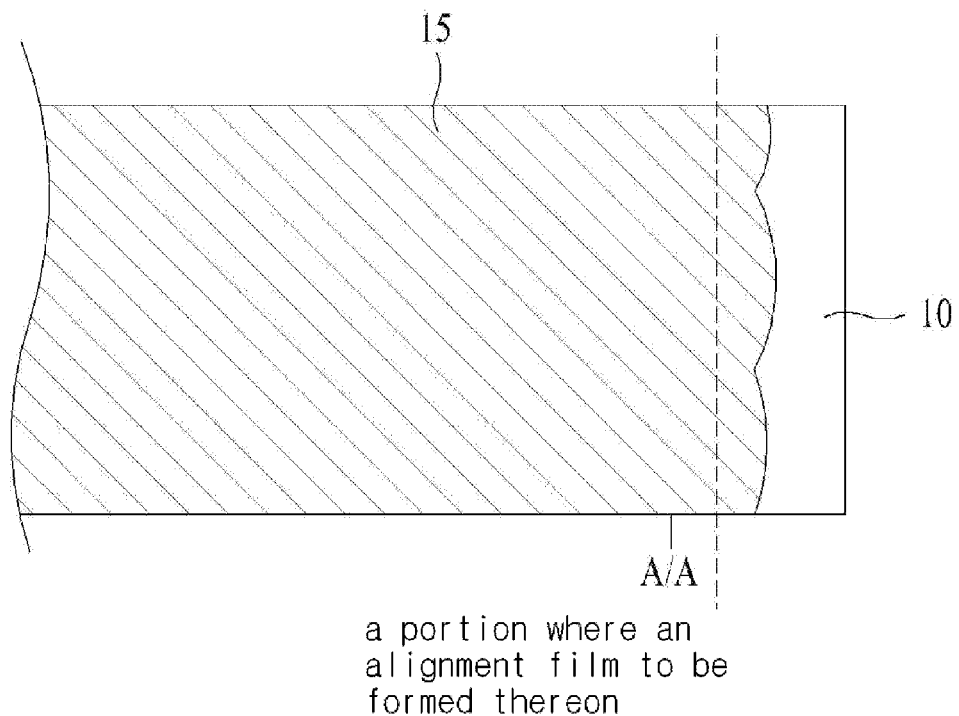
Figure 2:
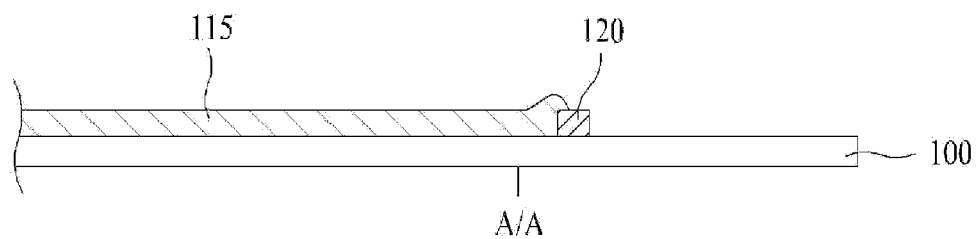
FIG. 2 illustrates a section view of a liquid crystal display device in accordance with a preferred embodiment of the present invention after coating an alignment film.
Figure 3:
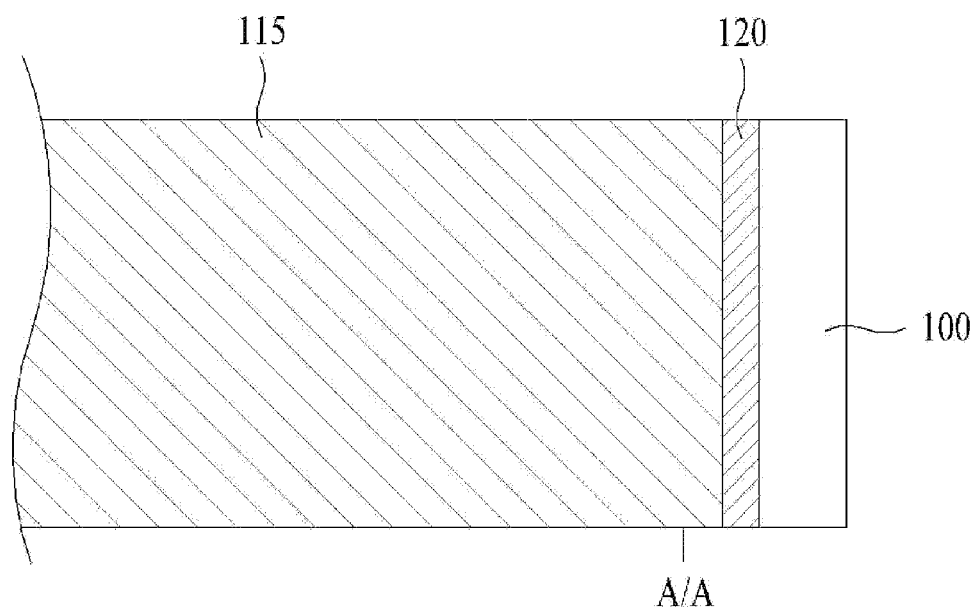
FIG. 3 illustrates a plan view of FIG. 2.

FIG. 2 illustrates a section view of a liquid crystal display device in accordance with a preferred embodiment of the present invention after coating an alignment film, and FIG. 3 illustrates a plan view of FIG. 2.

Referring to FIGS. 2 and 3, in the liquid crystal display device in accordance with a preferred embodiment of the present invention, a spread preventive wall 120 is provided on an inside of a seal pattern (not shown) on a first substrate 100 spaced from the seal pattern, so that alignment film liquid applied at the time of application of the alignment film liquid does not go over the spread preventive wall 120, but is confined in the spread preventive wall 120. The spread preventive wall 120 is formed on a boundary of the alignment film liquid in a shape of a wall, of a material the same with a column spacer formed at a color filter array and in the same step. The spread preventive wall 120 has a height lower than the column spacer or the seal pattern, such that the spread preventive wall 120 is not in contact with an opposite substrate while preventing the alignment film liquid 115 from going over. The height of the spread preventive wall 120 may be about 2~3 μm.

The alignment film liquid 115 is applied by using, for an example, an ink jet printer. In application of the alignment film liquid 115, solvent or the like is included therein and the alignment film liquid 115 may be applied about 2 μm height which becomes about 0.1 μm after a baking step as the solvent vaporize, finally.

The spread preventive wall 120 defines a limit of region of spread of the alignment film liquid 115 applied as a liquid.

Eventually, a coating margin provided in a space between the active region and the seal pattern taking the spread of the alignment film liquid can be reduced significantly, solving a problem of overlap of the alignment film and the seal pattern in a narrow model which has a narrow space between the active region and the seal pattern, that solves the peeling of the seal pattern, or gap defect, or light leakage defect.

The liquid crystal display device in accordance with a preferred embodiment of the present invention will be described, in more detail.

Figure 4:
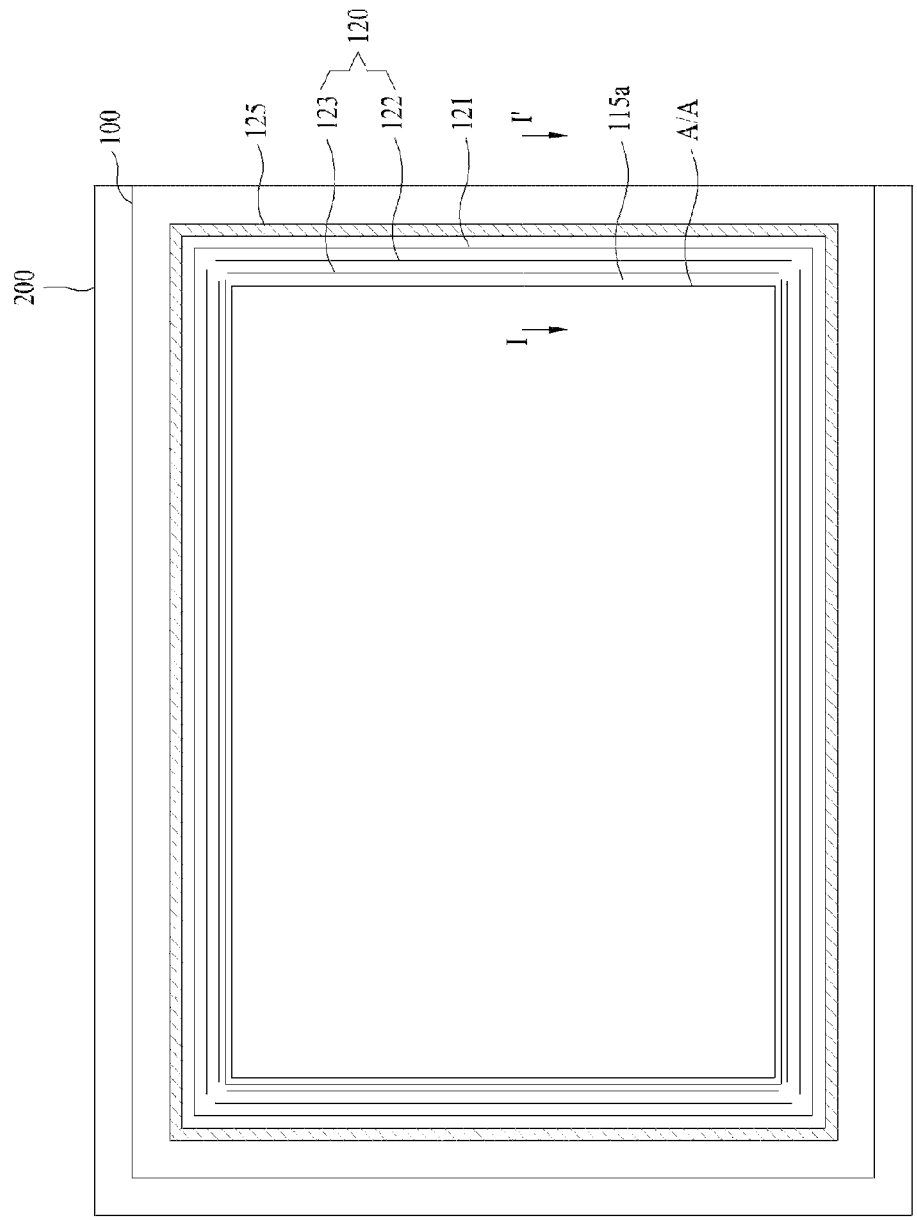
FIG. 4 illustrates a plan view of a liquid crystal display device in accordance with a preferred embodiment of the present invention.

FIG. 4 illustrates a plan view of a liquid crystal display device in accordance with a preferred embodiment of the present invention.

Referring to FIG. 4, the liquid crystal display device includes a first substrate 100 and a second substrate 200 opposite to each other, and a seal pattern 125 for bonding the first and second substrates 100 and 200 at peripheries thereof. The first and second substrates 100 and 200 have active regions A/A defined on an inside of the seal pattern 125 for making display of an image thereon. The color filter array is formed at the active region A/A of the first substrate 100, and the thin film transistor array is formed at the active region A/A of the second substrate 200.

The active region A/A where the image is displayed actually is defined within the seal pattern where the liquid crystals are filled therein, with a predetermined space provided between the active region A/A and the seal pattern 125. The space between the active region A/A and the seal pattern varies with panel sizes and applications, wherein the smaller the panel size, the smaller the space, and the panel size is smaller in models of notebook computers and cellular phones than TV sets. The space is greater than 1.5 μm.

On an inside of the seal pattern 125 spaced therefrom, there are a black matrix layer 121, a first spread preventive wall 122, and a second spread preventive wall 123. In this instance, it is preferable that first and second spread preventive walls 122 and 123 have opened four corners for preventing the liquid crystals dropped from forming lumps or formation of bubbles, as well as for preventing gravity defect from taking place by leading a portion of expanded surplus liquid crystals therethrough when the liquid crystals are expanded at a high temperature. In this instance, the first and second spread preventive walls 122 and 123 are formed on outsides of portions where the alignment film liquid 115 is to be coated respectively, taking spreadability of the alignment film liquid 115 into account.

In this instance, the portions where the alignment film liquid 115 is to be coated respectively are formed with additional margins in comparison to at least the active region A/A for preventing peripheries of the portion from being scratched at the time of rubbing if the peripheries are not coated with the alignment film liquid 115, thereby preventing light leakage defect, and as a countermeasure of a case when the alignment film liquid 115 is applied to active regions of respective panel regions at a mother substrate having a plurality of the panel regions defined thereon in a state the application is one sided in up/down, left/right direction.

Though the drawing shows the black matrix layer 121 formed on an outside of the first spread preventive wall 122, depending on models, the black matrix layer 121 is formed on an inside of the first and second spread preventive wall 122 and 123.

A method for fabricating a liquid crystal display device in accordance with a preferred embodiment of the present invention will be described, with reference to FIG. 5.

Figure 5:
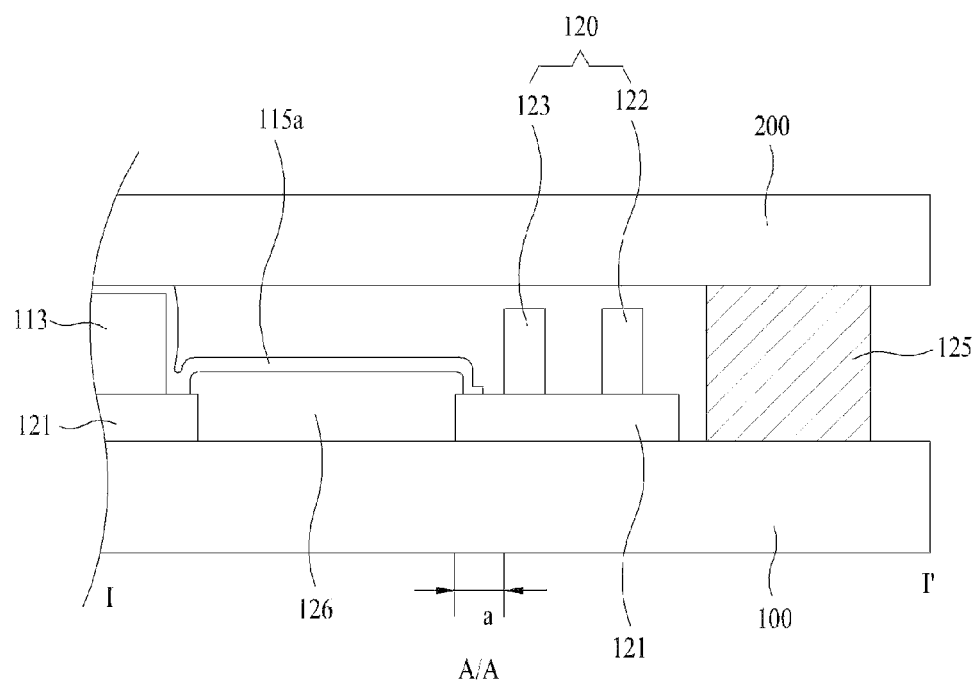
FIG. 5 illustrates a section view of a structure across a line I-I' in FIG. 4.

Referring to FIG. 5, first and second substrates 100 and 200 are provided.

A matrix of pixel regions at an active region A/A and non-pixel regions at boundary of each of the pixel regions are formed.

A black matrix layer 121 is formed on each of the non-pixel regions at the active region A/A on the first substrate 100, and on an outside circumference of the active region A/A for preventing leakage of light.

Then, color filter layers 126 are formed at least on the pixel regions at the active region A/A. The color filter layers 126 may overlap with the black matrix layer 121.

Then, a column spacer 113 is formed on a predetermined portion of the black matrix layer 121 at the active region A/A and first and second spread preventive walls 122 and 123 are formed between the seal pattern 125 and a boundary portion of the active region A/A.

The spread preventive wall may be one or, as shown, two or more than two. However, since the spread preventive wall surrounds the active region within the seal pattern, a number of the spread preventive walls can be limited due to widths of the seal pattern 125 and the boundary portion of the active region A/A, but the more the spread preventive walls, the greater the spread blocking capability of the alignment film liquid. In this instance, the second spread preventive wall 123 formed on an innermost side (the spread preventive wall when there is only one spread preventive wall) is formed to have a height of around 2 μm spaced at least 1 mm from the boundary portion of the active region A/A, taking spread of the alignment film liquid (115 in FIG. 2) into account.

Each of the first and second spread preventive walls 122 and 123 has a transverse width of 40~100 μm, which is very thin compared to a width of 1~2 mm of the seal pattern 125.

The first and second spread preventive walls 122 and 123 are formed by forming an organic film of acryl resin or the like on an entire surface of the first substrate 100 having the black matrix layer 121 and the color filter layers formed thereon, and patterning the organic film at the time the column spacer 113 is formed together with the column spacer 113 by using a halftone mask. That is, a portion of the halftone mask at the first and second spread preventive walls 122 and 123 is defined as a semi-transparent portion, such that, while a portion of the halftone mask at the column spacer defined as an opening or light shielding portion has an entire thickness of the organic film of the acryl resin remained thereon, the portion of the halftone mask at the first and second spread preventive walls 122 and 123 defined as the semi-transparent portion is formed relatively thin. In this case, each of the first and second spread preventive walls 122 and 123 has a height lower than a height of the column spacer 113 such that the first and second spread preventive walls 122 and 123 are not in contact with the second substrate 200 opposite thereto after the first and second substrates 100 and 200 are bonded. In view of a function, it is adequate that the first and second spread preventive walls 122 and 123 serve to prevent the alignment film liquid from spreading. It is preferable that the first and second spread preventive walls 122 and 123 are formed at a portion where the black matrix layer 121 is formed.

Then, the alignment film liquid 115 (See FIG. 2) is applied to an entire surface of the first substrate 100 including the column spacer 113 and the first and second spread preventive walls 122 and 123. In this instance, the alignment film liquid 115 does not go over the second spread preventive wall 123, but remained on an inside of the second spread preventive wall 123. Depending on cases, even if the alignment film liquid 115 goes over the second spread preventive wall 123 at the time an applied amount of the alignment film liquid 115 is excessive, the first spread preventive wall 122 on an outside of the second spread preventive wall 123 blocks spread of the alignment film liquid 115.

Then, the alignment film liquid 115 is baked to vaporize the solvent, to form an alignment film 115a.

Then, the seal pattern 125 of a close ring shape is formed on an outside of the first spread preventive wall 122.

A thin film transistor array formed on the second substrate at the active region A/A is not shown for convenience's sake. The thin film transistor array at the active region A/A has gate lines and data lines formed to cross each other at each of the non-pixel regions, a thin film transistor formed at every cross portion of the gate lines and the data lines, and a pixel electrode formed at each of the pixel regions. The alignment film may be formed even on the thin film transistor array.

Thus, after forming a liquid crystal layer on one of the first substrate 100 having the color filter array formed thereon and the second substrate 200 having the thin film transistor array formed thereon, the first substrate 100 and the second substrate 200 are placed to face each other, the seal pattern 125 is adhered to the second substrate 200, and the seal pattern 125 is hardened, to bond the first and the second substrates 100 and 200.

Figure 6:
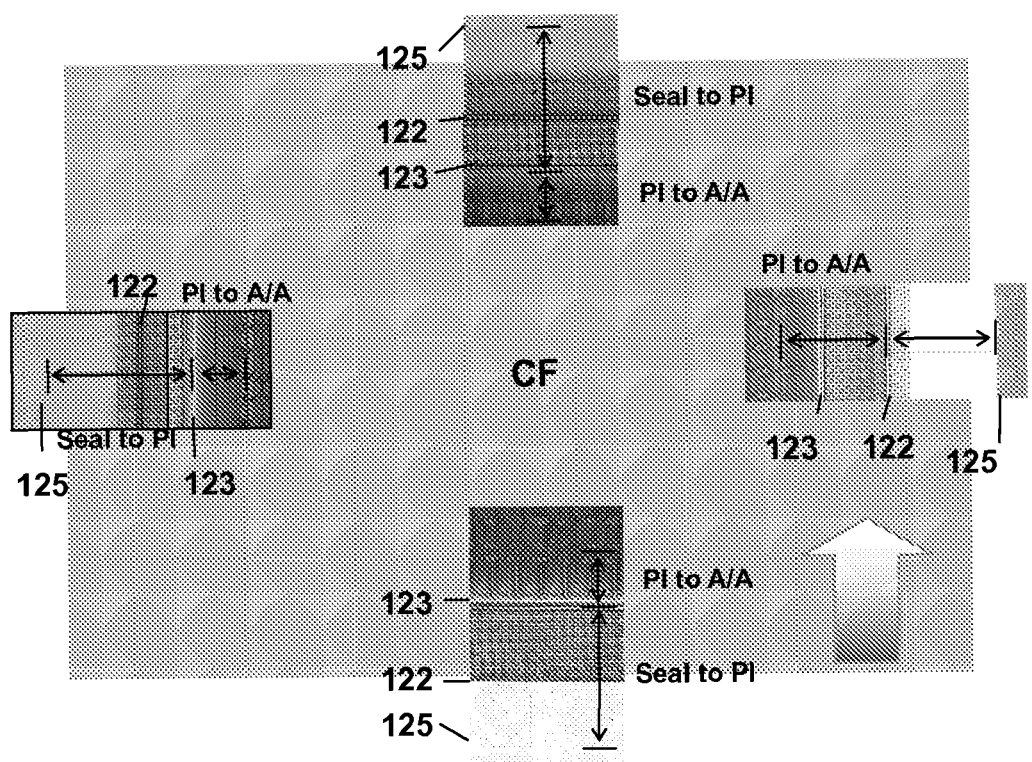
FIG. 6 illustrates a diagram showing extents of spread of alignment films on a lower substrate and an upper substrate and a relation between an active region and a seal pattern.

FIG. 6 illustrates a diagram showing extents of spread of alignment films on a lower substrate and an upper substrate and a relation between an active region and a seal pattern.

FIG. 6 shows an example in which the alignment film liquid applied beyond the boundary portion of the active region by 1 mm.

FIG. 6 illustrates enlarged photographs at, in a clockwise direction, an upper side center, a right side center, a lower side center, and a left side center, in a case the first and second spread preventive walls 122 and 123 are formed on an inside thereof spaced from the seal pattern 125.

It can be noticed that the alignment film liquid (PI: polyamide) 115 is spread up to the second spread preventive wall 123 on an inner side at all portions except the right side center portion.

In this instance, at the right side center, the alignment film liquid 115 is spread up to the first spread wall 122 on the outer side. It is supposed that the application of the alignment film liquid is one sided to a right side slightly, to block the spread of the alignment film liquid 115 at the second spread preventive wall 123 on the whole.

In a structure having the two spread preventive walls, which can be formed when the space between the boundary portion of the active region and the seal pattern is about 2.2~2.5 mm, wherein the first spread preventive wall 122 on an outer side is spaced at least 1 mm from the boundary portion of the active region A/A, and the second spread preventive wall 123 on an inner side is spaced within 1 mm from the boundary portion of the active region A/A. In the structure, average extents of spread of the alignment film liquid at the upper side center, the right side center, the lower side center, and the left side center are 575 μm, 1215 μm, 748 μm, and 715 μm respectively, and with a malposition of 5~20 μm.

From this test, it can be noticed that the alignment film liquid 115 is blocked at least by the first spread preventive wall 122.

Thus, if a plurality of the spread preventive walls are positioned, the spread preventive wall on the outermost side is formed spaced minimum 1 mm from the boundary portion of the active region, so that the spread preventive wall on the outermost side serves to prevent the alignment film liquid from going over, lastly.

Owing to this, the alignment film baked thus and the seal pattern do not come into contact to each other, thereby preventing the peeling of the seal pattern, seal pattern breakage, gap defect, or light leakage defect caused by overlap of the seal pattern and the alignment film.

Figure 7:
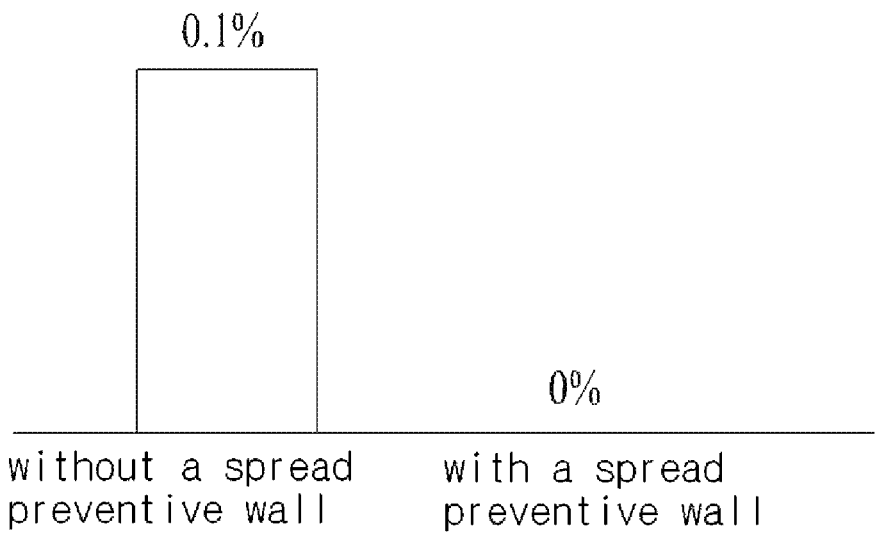
FIG. 7 illustrates a diagram comparing a defect occurring ratio between a structure having no spread preventive wall applied thereto, and a structure having a spread preventive wall applied thereto.
Figure 8:
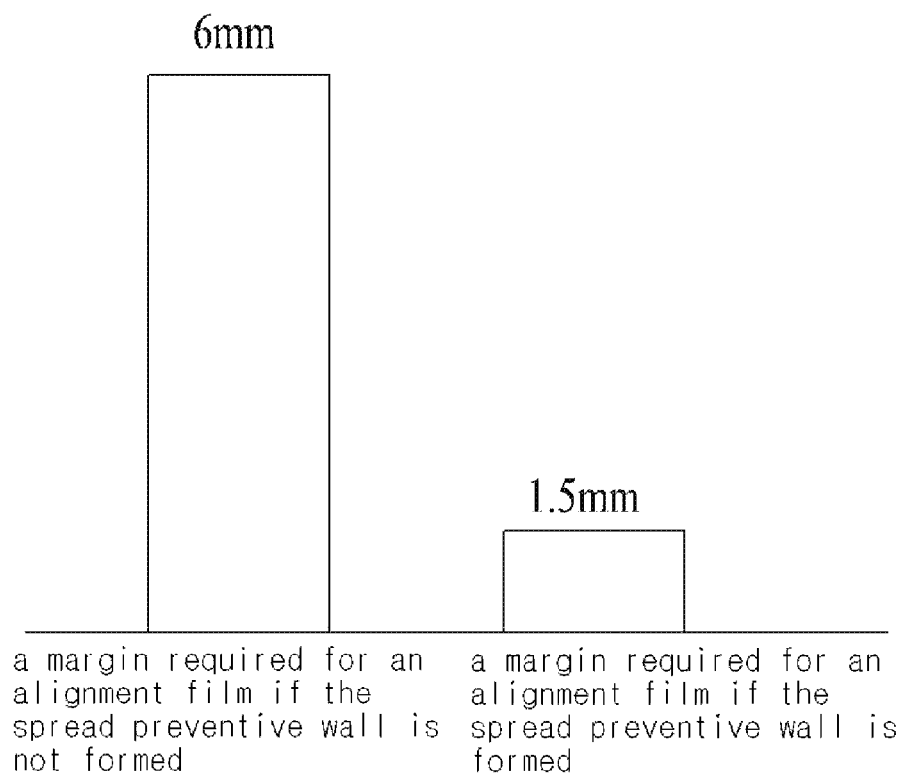
FIG. 8 illustrates a diagram comparing required print margins between a structure having no spread preventive wall applied thereto, and a structure having a spread preventive wall applied thereto.

FIG. 7 illustrates a diagram comparing a defect occurring ratio between a structure having no spread preventive wall applied thereto, and a structure having a spread preventive wall applied thereto, and FIG. 8 illustrates a diagram comparing required print margins between a structure having no spread preventive wall applied thereto, and a structure having a spread preventive wall applied thereto.

FIG. 7 illustrates extents of overlap of the seal pattern and the alignment film in the structure having no spread preventive wall applied thereto, and the structure having a spread preventive wall applied thereto. A left side diagram shows a case of the structure having no spread preventive wall applied thereto, and a right side diagram shows a case of the structure having the spread preventive wall applied thereto, showing that the extent of overlap of the seal pattern and the alignment film is 0% in the present invention, permitting to predict that the defects caused by overlap of the seal pattern and the alignment film can be improved.

Moreover, as noticed from FIG. 6, the spread of the alignment film liquid is limited to within 1.3 mm if the structure having the spread preventive wall applied thereto, and, as shown in FIG. 8, if the spread preventive wall of the present invention is used, a required application margin of the alignment film is reduced to 1.5 mm from 6 mm.

As has been described, the liquid crystal display device and the method for fabricating the same of the present invention have the following advantages.

The spread preventive wall is spaced from the active region. That is, the spread preventive wall is formed together with the column spacer, to serve as a blocking film when the alignment film applied is spread. Owing to this, the spread preventive wall can block liquid rolling at an edge of spread of the alignment film, and depending on cases, a plurality of the spread preventive walls are provided to block the spread of the alignment film doubly or triply. Eventually, overlap of the seal pattern on an outside circumference of the spread preventive wall and the alignment film are prevented, to prevent peeling of the seal pattern, breakage of the seal pattern, a gap defect, or light leakage defect caused by the overlap of the alignment film and the seal pattern, thereby improving defect of display.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   first and second substrates placed opposite to each other, each having an active region at a center thereof;
   a column spacer inside the active region to maintain a cell gap between the first and second substrates;
   a seal pattern formed on an outside circumference of the active region spaced about 2.2 mm -2.5 mm from the active region, between the first substrate and the second substrate;
   a first spread preventive wall and a second spread preventive wall spaced from each other on the first substrate, formed between the active region and the seal pattern, wherein the first and second spread preventive walls have a height lower than the column spacer; and an alignment film formed on an inner side of the second spread preventive wall on the first substrate, wherein the second spread preventive wall is spaced about 1 mm or more than 1 mm from the active region.

2. The liquid crystal display device as claimed in claim 1, wherein the first and second spread preventive walls have four opened corners, respectively.

3. The liquid crystal display device as claimed in claim 1, further comprising:

black matrix layers formed at a portion inside the active region of the first substrate and an outside of the active region; and color filter layers formed at the active region of the first substrate, wherein the column spacer is formed on the black matrix layer inside the active region.

4. The liquid crystal display device as claimed in claim 3, wherein the first and second spread preventive walls are formed on the same layer with the column spacer.

5. A method for fabricating a liquid crystal display device comprising the steps of:

providing first and second substrates each having an active region at a center thereof;

forming black matrix layers and color filter layers on the first substrate;

applying an organic insulating film on an entire surface of the first substrate including the black matrix layers and the color filter layers and removing the organic insulating film selectively, to form a column spacer on a portion of the black matrix layer at a portion inside the active region and, a first spread preventive wall and a second spread preventive wall spaced from each other, on an outside of the active region, wherein the second spread preventive wall is spaced about 1 mm or more than 1 mm from the active region;

forming an alignment film at the active region of the first substrate including the black matrix layers, the color filter layers, and the column spacer, wherein the alignment formed on an inner side of film within the second spread preventive wall;

forming a seal pattern on an outside circumference of the active region spaced 2.2 mm -2.5 mm from the active region to surround the first and second preventive walls;

forming a thin film transistor array at the active region of the second substrate;

forming a liquid crystal layer on one of the first and second substrates; and bonding the first and second substrates together, wherein the first and second spread preventive walls have a height lower than the column spacer.

6. The method as claimed in claim 5, wherein the first and second spread preventive walls have a transverse width of 40-100 µm, respectively.

* * * * *